Aug. 9, 1955  O. H. CLAYTON  2,714,905
PORTABLE SAW ATTACHMENT TO A POWER DRIVEN HAND TOOL
Filed Nov. 5, 1951  2 Sheets-Sheet 1

Oliver H. Clayton
INVENTOR.

BY *Clarence A. O'Brien*
*and Harvey B. Jacobson*
Attorneys

Aug. 9, 1955            O. H. CLAYTON            2,714,905
PORTABLE SAW ATTACHMENT TO A POWER DRIVEN HAND TOOL
Filed Nov. 5, 1951            2 Sheets-Sheet 2
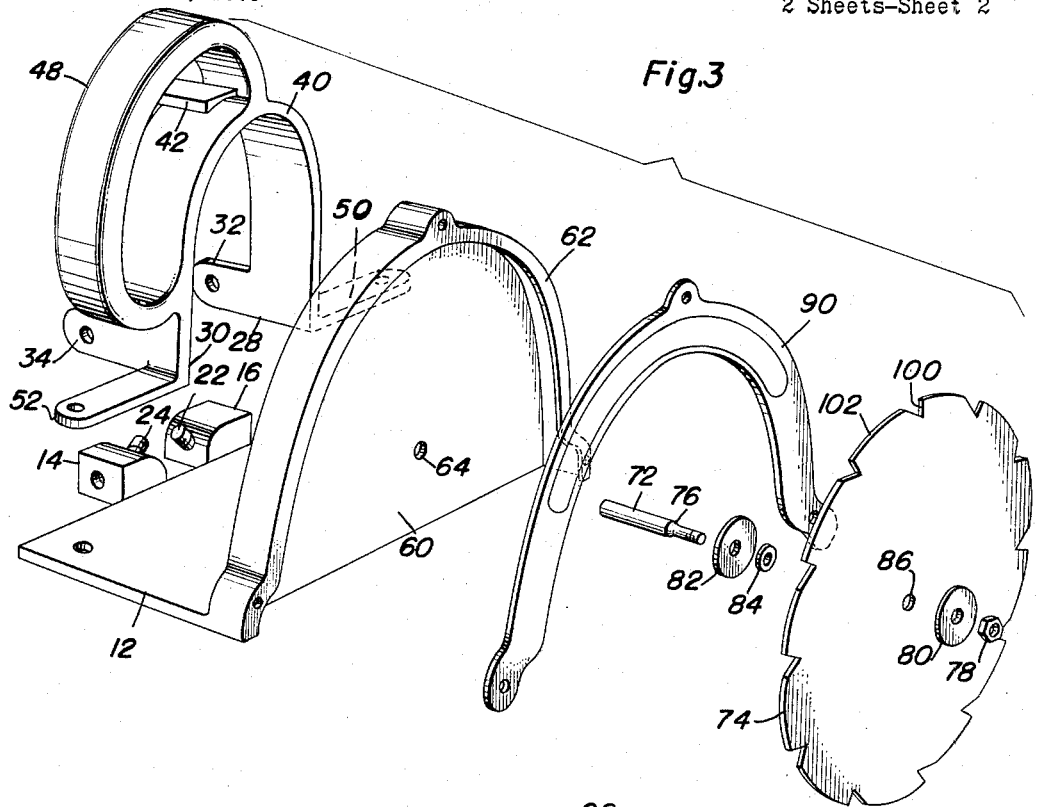
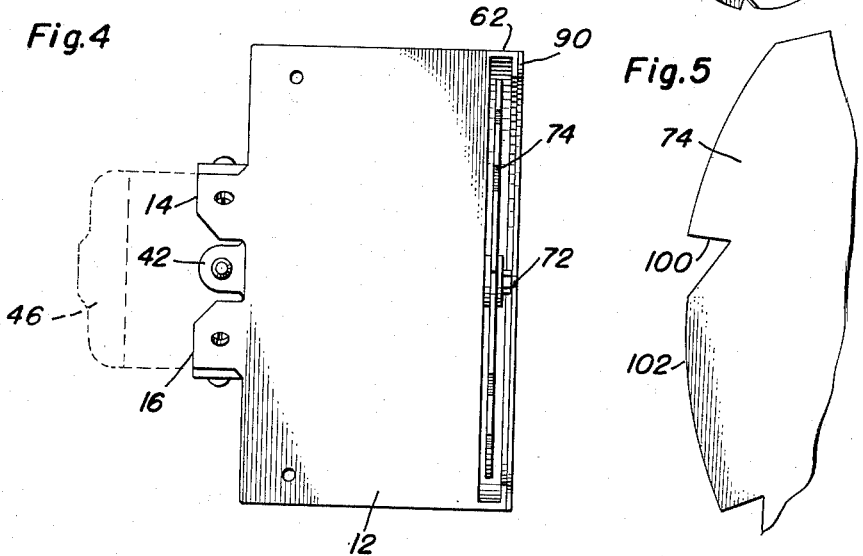
Oliver H. Clayton
INVENTOR.

United States Patent Office 2,714,905
Patented Aug. 9, 1955

2,714,905

PORTABLE SAW ATTACHMENT TO A POWER DRIVEN HAND TOOL

Oliver H. Clayton, Van Nuys, Calif.

Application November 5, 1951, Serial No. 254,846

7 Claims. (Cl. 143—43)

This invention relates to a portable saw and particularly to a saw designed to be driven by power driven hand tool such as a drill motor.

In light construction, maintenance and repair work it is desirable to have a portable saw capable of cutting ordinary building timber such as two by fours and two by eights. Many types of portable and bench saws have been constructed for such operation. However, such saws heretofore have either been too expensive or too heavy for normal operation.

The present saw comprises a saw frame adapted to hold a safety saw and be driven by another power driven instrument such as a portable drill.

The construction according to the present invention comprises a mounting plate on which the power or driving device can be mounted and having a chuck to hold a saw arbor which is maintained substantially perpendicular to a guide plate and has a safety saw mounted thereon and substantially enclosed within the guide plate so that the saw is unusually safe for normal working conditions. It is accordingly an object of this invention to provide an improved portable saw.

It is a further object of this invention to provide a portable saw utilizing a second power driven instrument as a source of power.

It is a further object of this invention to provide an improved mounting for maintaining a power driving tool in driving relation with a portable saw.

It is a further object of this invention to provide a portable saw having a safety saw feature.

It is a further object of this invention to provide a saw having means for regulating the depth of cut.

Other objects and many of the attendant advantages of this invention will be apparent from the following detailed description taken in conjunction with the accompanying drawings in which:

Figure 3 is an exploded perspective view showing the component parts of the saw;

Figure 4 is a bottom view of the saw frame; and

Figure 5 is an enlarged fragmentary view showing the construction of the blade bight.

Figure 1:
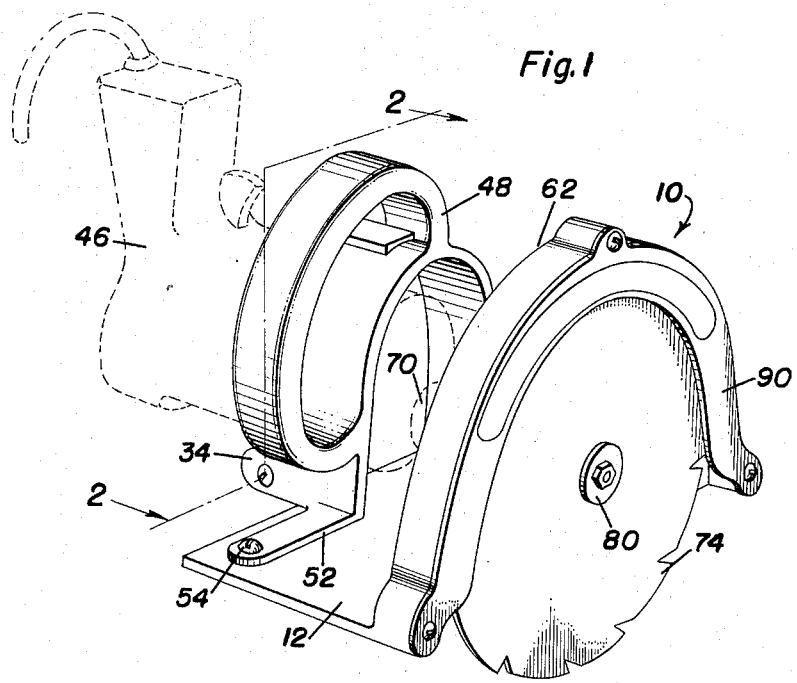
Figure 1 is a perspective view of the portable hand saw according to this invention.
Figure 2:
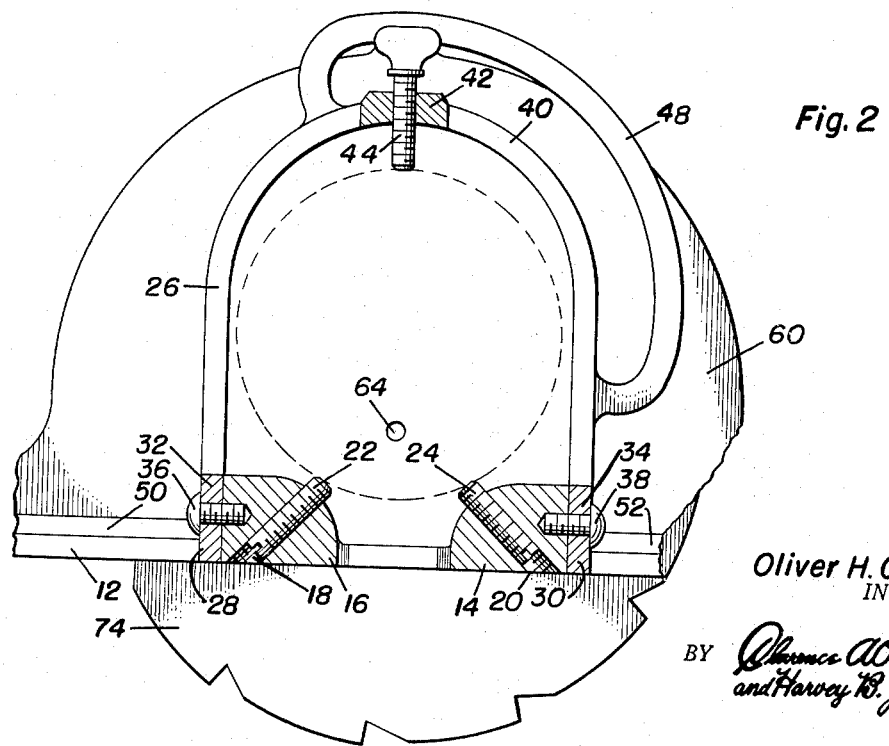
Figure 2 is an enlarged cross section through the motor mount taken substantially on the plane indicated by line 2—2 of Figure 1.

An exemplary embodiment of the invention according to the drawings, a saw indicated generally at 10 has a base 12 including a pair of opposite mounting blocks 14 and 16: each of the mounting blocks 14 and 16 is provided with an angularly directed aperture 18 or 20 in respectively in which are mounted adjusting screws 22 and 24. The adjusting screws 22 and 24 are in angularly related partly opposed positions in a common plane so that if the screws 22 and 24 were extended they would meet in a common point.

A substantially U-shaped mounting frame 26 has its ends 28 and 30 provided with longitudinally extending ears 32 and 34 attached to the blocks 16 and 14 by means of suitable fasteners such as screws 36 and 38. The arcuate top 40 of the frame 26 is provided with a longitudinally extending lug 42 in which is mounted a thumb screw 44. The thumb screw 44 cooperates with the adjusting screws 22 and 24 and the locking screw to maintain a motor driven tool such as a portable drill 46 in rigid assembled relation with respect to the mounting blocks 16 and 14 and the mounting frame 26. The screw 44 is in exactly the same plane as the screws 22 and 24 so that if they were extended all would meet in a common point. In the illustrated embodiments of the invention, the screws 22 and 24 are set at an angle of substantially 45° and relatively close together so that they meet relatively close to a periphery of the tool 46 for a purpose presently to be described.

An arcuate handle 48 is rigidly attached preferably integrally attached to the arcuate portion of the U-shaped frame 22 and somewhat to one side thereof so that the entire saw device may be easily handled by one hand of the operator grasping the handle 48.

In order to rigidify the structure the frame 26 is provided with laterally extending ears 50 and 52 which lie substantially flat on the surface of the plate 12 and is attached thereto by means of suitable separable fasteners such as screws 54.

An upstanding saw guide plate 60 is rigidly attached to one end of the base plate 22 and is preferably integral therewith. An axially extending arcuate hood 62 is preferably integral with or rigidly secured to the guide plate 60. The guide plate 60 is provided with an aperture 64 substantially coaxial with the arcuate hood 62.

The portable drill 46 is provided with the usual chuck 70 for the reception of round tools such as drills or the stems of other tools. The drill 46 is adjusted by means of adjusting screws 24 and 28 so that the chuck 70 is aligned with the aperture 64 in the guide plate 60 and locked in position by means of thumb screw 44. An arbor 72 is extended through the aperture 64 and locked in the chuck 70 and the improved safety saw blade 74 is locked against a shoulder 76 and on the arbor 72 by means of nuts and washers 78 and 80. A washer 82 is seated on the shoulder 76 so that the saw blade 74 is retained between the washers 80 and 82. If necessary a filler washer 84 may be placed in the aperture 86 of the saw blade 74 so that the saw blade will be held exactly concentric with the shaft 72.

The blade 74 mounted on the shaft 72 is adjacent to and should be adjusted parallel with the guide plate 60 at which time it will be substantially contained on the hood 62. A guard 90 is attached to the hood 62 and extends down over the peripheral portion of the blade 74 so that a substantial portion of the blade 74 is within the guard 90 and under the hood 62 so that only a small portion of the blade is exposed and that only at the working position.

The safety saw blade 74 is provided with a plurality of spaced apart cutting teeth 100 on the periphery of the circular disc. Interspersed between the teeth 100 is a substantially arcuate section 102 which is but slightly relieved from the teeth so that it provides a non-cutting guide surface on the periphery of the disc. The non-cutting guide surface 102 prevents excessive penetration of the saw into the material being cut so that there is almost no stalling tendency in the saw. Likewise, the safety saw will not tend to drag clothing or other portions of material it may come in contact with into the saw.

It will thus be seen that there has been provided a light readily portable saw which will be sufficient to cut all normal construction or repair timbers. While, the saw itself is substantially a safety device having means for preventing excessive loading of the saw or excessive penetration of the saw.

While for purposes of exemplification, a particular embodiment of the invention has been shown and described according to the best present understanding thereof, it will be apparent that many changes and modifications may be therein without departing from the spirit of the invention.

Having described the invention, what is claimed as new is:

1. A portable rotary saw mounting attachment for attaching a saw to a power driven rotary hand tool, comprising a horizontal base, a pair of spaced parallel upstanding mounting blocks on said base adapted to form a support for a hand tool, an adjusting screw in each of said blocks, said screws being arranged in angular relation to each other and extending upwardly and inwardly toward the space between the blocks, a mounting frame carried by said base and spacedly overlying said blocks, a locking screw carried by said mounting frame and projecting into the space between said mounting frame and said blocks in opposed relation to said adjusting screws whereby a hand tool may be adjustably clamped on said base and block assembly, an upstanding guide plate on said base remote from said mounting blocks, said guide plate having a rotary saw blade carrying arbor journaled therethrough in generally axial relation to the space formed between said blocks and frame for operative connection to a hand tool clamped to said base and block assembly.

2. A portable rotary saw mounting attachment for attaching a saw to a power driven rotary hand tool, comprising a horizontal base, a pair of spaced parallel upstanding mounting blocks on said base adapted to form a support for a hand tool, an adjusting screw in each of said blocks, said screws being arranged in angular relation to each other and extending upwardly and inwardly toward the space between the blocks, a mounting frame carried by said base and spacedly overlying said blocks, a locking screw carried by said mounting frame and projecting into the space between said mounting frame and said blocks in opposed relation to said adjusting screws whereby a hand tool may be adjustably clamped on said base and block assembly, an upstanding guide plate on said base remote from said mounting blocks, said guide plate having a rotary saw blade carrying arbor journaled therethrough in generally axial relation to the space formed between said blocks and frame for operative connection to a hand tool clamped to said base and block assembly, said mounting frame being of inverted U-shape, the bight portion of said frame spacedly overlying and bridging the space between said blocks, said locking screw being carried by said bight portion.

3. A portable rotary saw mounting attachment for attaching a saw to a power driven rotary hand tool, comprising a horizontal base, a pair of spaced parallel upstanding mounting blocks on said base adapted to form a support for a hand tool, an adjusting screw in each of said blocks, said screws being arranged in angular relation to each other and extending upwardly and inwardly toward the space between the blocks, a mounting frame carried by said base and spacedly overlying said blocks, a locking screw carried by said mounting frame and projecting into the space between said mounting frame and said blocks in opposed relation to said adjusting screws whereby a hand tool may be adjustably clamped on said base and block assembly, an upstanding guide plate on said base remote from said mounting blocks, said guide plate having a rotary saw blade carrying arbor journaled therethrough in generally axial relation to the space formed between said blocks and frame for operative connection to a hand tool clamped to said base and block assembly, said mounting frame being of inverted U-shape, the bight portion of said frame spacedly overlying and bridging the space between said blocks, said locking screw being carried by said bight portion, the open end of said frame being secured to said blocks.

4. A portable rotary saw mounting attachment for attaching a saw to a power driven rotary hand tool, comprising a horizontal base, a pair of spaced parallel upstanding mounting blocks on said base adapted to form a support for a hand tool, an adjusting screw in each of said blocks, said screws being arranged in angular relation to each other and extending upwardly and inwardly toward the space between the blocks, a mounting frame carried by said base and spacedly overlying said blocks, a locking screw carried by said mounting frame and projecting into the space between said mounting frame and said blocks in opposed relation to said adjusting screws whereby a hand tool may be adjustably clamped on said base and block assembly, an upstanding guide plate on said base remote from said mounting blocks, said guide plate having a rotary saw blade carrying arbor journaled therethrough in generally axial relation to the space formed between said blocks and frame for operative connection to a hand tool clamped to said base and block assembly, said mounting frame being of inverted U-shape, the bight portion of said frame spacedly overlying and bridging the space between said blocks, said locking screw being carried by said bight portion, the open end of said frame being secured to said blocks, laterally extending ears on said frame adjacent the open end of said frame, means attaching said ears to said base plate.

5. A portable rotary saw mounting attachment for attaching a saw to a power driven rotary hand tool, comprising a horizontal base, a pair of spaced parallel upstanding mounting blocks on said base adapted to form a support for a hand tool, an adjusting screw in each of said blocks, said screws being arranged in angular relation to each other and extending upwardly and inwardly toward the space between the blocks, a mounting frame carried by said base and spacedly overlying said blocks, a locking screw carried by said mounting frame and projecting into the space between said mounting frame and said blocks in opposed relation to said adjusting screws whereby a hand tool may be adjustably clamped on said base and block assembly, an upstanding guide plate on said base remote from said mounting blocks, said guide plate having a rotary saw blade carrying arbor journaled therethrough in general axial relation to the space formed between said blocks and frame for operative connection to a hand tool clamped to said base and block assembly, an arcuate hood on said guide plate, the saw blade carried by said arbor being disposed under said hood, an arcuate guard attached to said hood overlying a peripheral portion of the saw blade.

6. A portable saw comprising a horizontal base plate, a pair of spaced, generally parallel, opposed mounting blocks upstanding near one side of said base plate, an adjusting screw in each of said blocks, said screws being arranged in angular relation to each other end extending upwardly and inwardly toward the space between the blocks, an inverted U-shaped mounting frame, the open end of said frame being secured to said blocks, a locking screw carried by the bight of said frame, said locking screw extending in opposed relation to said adjusting screws whereby a power driven rotary hand tool may be adjustably mounted on said plate and block assembly, laterally extending ears on said frame, said ears being attached to said base plate, an upstanding guide plate at the other side of said base, an arcuate hood on said guide plate, said guide plate having an aperture substantially coaxial with said hood, an arbor adapted to extend through said aperture and be operatively connected to a rotary hand tool mounted on said base plate and block assembly, a rotary saw blade mounted on said arbor and under said hood, an arcuate saw guard attached to said hood and overlying a peripheral portion of said saw blade.

7. In a portable saw, a motor mount comprising a horizontal base plate, a pair of spaced, parallel, upstanding mounting blocks on said base plate, an adjusting screw in each of said blocks, said screws being arranged in angular relation to each other and extending upwardly and inwardly between the blocks, an inverted U-shaped mounting frame, the open end of said frame being secured to said blocks, a locking screw carried by the bight of said frame, said locking screw extending in opposed relation to said adjusting screws whereby to clamp a motor in place on said base plate between said blocks and said mounting frame.

References Cited in the file of this patent

UNITED STATES PATENTS

| Number | Name | Date |
|---|---|---|
| 7,603 | Knowles | Aug. 27, 1850 |
| 733,744 | Raettig | July 14, 1903 |
| 787,532 | McCreery | Apr. 18, 1905 |
| 1,316,027 | Halbreich | Sept. 16, 1919 |
| 1,570,935 | Booth | Jan. 26, 1926 |
| 1,706,157 | Hannah | Mar. 19, 1929 |
| 1,779,031 | Casey | Oct. 21, 1930 |
| 1,785,065 | Aborn | Dec. 16, 1930 |
| 1,811,079 | Forsyth | June 23, 1931 |
| 1,883,392 | Moll | Oct. 18, 1932 |
| 1,845,438 | Parkhurst | Feb. 16, 1932 |
| 1,923,967 | Brown | Aug. 22, 1933 |
| 2,519,526 | Wilber | Aug. 22, 1950 |
| 2,559,355 | Grupp | July 3, 1951 |

FOREIGN PATENTS

| Number | Country | Date |
|---|---|---|
| 544,756 | France | July 3, 1922 |

OTHER REFERENCES

American Machinist, "Layout Cube," page 136, April 10, 1947.